United States Patent
Li et al.

(10) Patent No.: US 9,908,798 B2
(45) Date of Patent: Mar. 6, 2018

(54) METHOD FOR RESOURCEFUL UTILIZATION OF DESORPTION LIQUID GENERATED IN THE RESIN ION EXCHANGE PROCESS

(71) Applicant: Nanjing University, Nanjing, Jiangsu (CN)

(72) Inventors: Aimin Li, Jiangsu (CN); Zixiao Xu, Jiangsu (CN); Wentao Li, Jiangsu (CN); Bicun Jiang, Jiangsu (CN); Qing Zhou, Jiangsu (CN); Chendong Shuang, Jiangsu (CN); Yeli Jiang, Jiangsu (CN); Mengqiao Wang, Jiangsu (CN)

(73) Assignee: NANJING UNIVERSITY, Nanjing, Jiangsu (CN)

( * ) Notice: Subject to any disclaimer, the term of this patent is extended or adjusted under 35 U.S.C. 154(b) by 689 days.

(21) Appl. No.: 14/308,616

(22) Filed: Jun. 18, 2014

(65) Prior Publication Data
US 2014/0367331 A1 Dec. 18, 2014

(30) Foreign Application Priority Data

Apr. 19, 2013 (CN) .......................... 2013 1 0137152

(51) Int. Cl.
| | | |
|---|---|---|
| *C02F 3/12* | (2006.01) | |
| *C02F 9/00* | (2006.01) | |
| *C02F 1/44* | (2006.01) | |
| *C02F 1/52* | (2006.01) | |
| *C02F 1/66* | (2006.01) | |
| *C02F 1/72* | (2006.01) | |

(52) U.S. Cl.
CPC .................. *C02F 3/12* (2013.01); *C02F 9/00* (2013.01); *C02F 1/442* (2013.01); *C02F 1/444* (2013.01); *C02F 1/5245* (2013.01); *C02F 1/66* (2013.01); *C02F 1/722* (2013.01); *C02F 2209/001* (2013.01); *C02F 2209/003* (2013.01); *C02F 2209/02* (2013.01); *C02F 2209/03* (2013.01); *C02F 2209/10* (2013.01); *C02F 2209/22* (2013.01); *C02F 2303/16* (2013.01); *C02F 2305/06* (2013.01); *Y02W 10/15* (2015.05)

(58) Field of Classification Search
None
See application file for complete search history.

(56) References Cited

U.S. PATENT DOCUMENTS

| | | | | |
|---|---|---|---|---|
| 4,511,676 A | * | 4/1985 | Reichgott | B01J 49/0078 521/26 |
| 4,749,492 A | * | 6/1988 | Berrigan, Jr. | B03D 3/06 209/5 |
| 5,006,258 A | * | 4/1991 | Veatch | B01D 53/1425 210/677 |
| 5,055,197 A | * | 10/1991 | Albright | B01D 61/145 210/259 |
| 5,254,257 A | * | 10/1993 | Brigano | B01D 61/022 210/639 |
| 5,538,636 A | * | 7/1996 | Gnann | C02F 1/4678 204/520 |
| 5,610,065 A | * | 3/1997 | Kelley | B09C 1/08 435/262 |
| 6,113,797 A | * | 9/2000 | Al-Samadi | B01D 61/022 210/650 |
| 6,368,511 B1 | * | 4/2002 | Weissenberg | C02F 11/06 210/743 |
| 8,236,178 B2 | * | 8/2012 | Ruehr | B01D 61/025 210/636 |
| 2006/0091077 A1 | * | 5/2006 | Haas | B01D 61/025 210/641 |
| 2006/0113242 A1 | * | 6/2006 | Ishikawa | C02F 3/006 210/601 |
| 2007/0102359 A1 | * | 5/2007 | Lombardi | B01D 17/085 210/639 |

FOREIGN PATENT DOCUMENTS

| | | | |
|---|---|---|---|
| CN | 101659457 | * | 3/2010 |
| CN | 102050554 | * | 5/2011 |

OTHER PUBLICATIONS

Machine Translation of CN 101659457, Li et al., Mar. 3, 2010, pp. 1-7.*
Machine Translation of CN 102050554, Li et al., May 11, 2011, pp. 1-6.*

* cited by examiner

Primary Examiner — Bobby Ramdhanie
Assistant Examiner — Michael An
(74) Attorney, Agent, or Firm — Novick, Kim & Lee, PLLC; Allen Xue

(57) ABSTRACT

Provided is a method for resourceful utilization of desorption liquid generated in the resin ion exchange process. This method effectively separates highly-concentrated organics and salts from the desorption liquid and puts these two components into comprehensive utilization.

11 Claims, No Drawings

METHOD FOR RESOURCEFUL UTILIZATION OF DESORPTION LIQUID GENERATED IN THE RESIN ION EXCHANGE PROCESS

FIELD OF THE INVENTION

This invention relates to a method for resourceful utilization of desorption liquid generated in resin ion exchange, specifically to a method for innocent treatment and resourceful utilization of highly-concentrated desorption liquid generated from the resin ion exchange process that is widely adopted for deep treatment of drinking water and sewage.

BACKGROUND OF THE INVENTION

Water pollution has become a severe challenge in China in recent years. On the one hand, water shortage has become one of the main constraints for the development of China Mid-west and China North, and deep treatment of municipal sewage and industrial wastewater are in great demand to increase utilization rate of reclaimed water; on the other hand, issues about drinking water safety have turned increasingly serious, with more and more bio-toxic organic pollutants in trace amounts being found in water bodies. In response to this situation, China Ministry of Health [now called "National Health and Family Planning Commission"] and China Standardization Administration jointly revised the "Standards for Drinking Water Quality" (GB5749-2006), increasing the quality indicators from 35 items to 106 items. This new "National Standards" took effect on Jul. 1, 2007. Its implementation means higher standards are required to guarantee the drinking water safety. Accordingly, many conventional processes for supplying drinking water cannot meet the new standards. New economical yet effective methods for deep purification of water are in great demand.

Resin adsorption is one of the commonest techniques for water deep treatment. The ion exchange resin can remove pollutants in water by adsorbing them onto its surface through electrostatic attraction. It exhibits considerably high efficiency in removing various recalcitrant substances and trace pollutants. In comparison with other techniques for water deep purification, the ion exchange process exhibits many advantages, such as good purification effect, low operational cost, moderate investment amount and simple operating procedure. However, when being put into practical application, a certain amount of desorption liquid will be generated. The constitution of the desorption liquid is very complex; it usually contains high concentration of organics and salts, and presents high chromaticity and poor biodegradability.

The common methods to dispose desorption liquid include solidification and burial, evaporating condensation and incineration, and advanced oxidation. The method of solidification and burial involves merely displacement of pollutants and it usually takes up substantial land resources. On the contrary, a thorough treatment can be obtained if the desorption liquid is firstly treated with evaporating condensation and then incineration; however, the evaporation process consumes a large quantity of energy and therefore pushes up the production cost. Another widely-used method for treatment of desorption liquid is advanced oxidation, during which desorption liquid undergoes various advanced oxidation processes before being channeled to a municipal sewage treatment plant for further treatment. The advanced oxidation can be realized through various processes, such as ozone oxidation, Fenton oxidation, electrocatalytic oxidation; these processes can achieve desirable effect in treatment of desorption liquid. However, as there exists a considerably large quantity of desorption agent in the liquid, it would be on the one hand a waste of resources if the desorption agent is not effectively separated out and put into reuse, and on the other hand bring about adverse influence upon the final treatment of the municipal sewage. Therefore, in order to further tap the potential of the resin ion exchange process in water deep purification, a new method for economical yet effective treatment of desorption liquid is urgently required.

The composite iron enzymatic activated sludge process involves the enhancement of microbial activity with the iron ion. The iron ions participate in electron transfer reaction and can act as the activator for the enzymatic reaction by means of mediating biochemical reaction of microbes and their energy metabolism. It can enhance metabolic activity of microbes and improve the flocculent structure of activated sludge, which consequently enhances microbes' tolerance against environmental change. However, insofar as the field of desorption liquid treatment is concerned, no documents have been disclosed in transforming desorption liquid into the nutrient solution for the composite iron enzymatic activated sludge.

The membrane separation is a widely-used technique for separating substances as it is only a physical process and involves no new substance or phase change. The pore size of the membrane is usually at micron scale. According to the specific size (also called "molecular weight cutoff or MWCO") of membrane pores, the filtration membrane can be divided into microfiltration membrane, ultrafiltration membrane, nanofiltration membrane and reverse osmosis membrane; according to the material of membrane, it can be divided into inorganic membrane and organic membrane; the inorganic membrane is mainly made of ceramic and metal. Currently, the membrane separation technique is widely adopted in beverage industry, food industry, pharmaceutical industry, seawater desalinization, preparation of pure water or ultrapure water, and wastewater treatment. When being used in the wastewater treatment field, it is mainly adopted to realize deep treatment and recycled use of lowly-concentrated water that has undergone the secondary treatment. The membrane separation technique is rarely used to treat the highly-concentrated wastewater.

As there exist high concentration of organics and the regeneration agent in the resin desorption liquid, skilled personnel in the field of desorption liquid treatment have long been designing new methods to separate out organics and the regeneration agent from the desorption liquid, which can simultaneously realize innocent treatment of the desorption liquid and resourceful utilization of organics and the regeneration agent.

To those skilled in the art, it is a constant challenge how to effectively integrate the composite iron enzymatic activated sludge process and the membrane separation technique together so as to realize resourceful utilization of highly-concentrated organics and the regeneration agent contained in the resin desorption liquid.

SUMMARY OF THE INVENTION

1. The Technical Problems to be Solved

When being used for water deep purification, the resin ion exchange process will generate a certain amount of desorption liquid. It usually contains high concentration of organics and salts, and presents poor biodegradability. It is hard for existing techniques to realize economical yet effective utilization of this type of liquid. The present invention provides a method for resourceful utilization of desorption liquid generated in the resin ion exchange process. This method adopts ultrafiltration and nanofiltration consecutively to realize double membrane separation of desorption liquid. The major separated component contains high concentration of salts and low concentration of organics; it is reused as the regeneration agent and its regeneration efficiency is similar to the fresh desorption agent; the minor separated component contains high concentration of organics; after being treated with Fenton oxidation, it is utilized as the iron-containing nutrient solution in the biochemical treatment unit; the iron ions contained therein participate in electron transfer reaction and act as the activator of enzymatic reaction, which consequently enhance the activity of biochemical reaction and improve the flocculent structure of the sludge.

2. Technical Solutions

A method for resourceful utilization of desorption liquid generated in the resin ion exchange process, comprising the following steps:
(1) channeling the desorption liquid generated in the resin ion exchange process for water deep purification through an ultrafiltration membrane and separating said desorption liquid containing high concentration of organics and salts at 10-45° C. and 0.2-2.0 MPa; 50-95% of the original desorption liquid will turn to be the filtrate, which presents low turbidity and high salinity; 5-50% of the original desorption liquid will turn to be concentrate, which is comparatively small in proportion and contains high concentration of organics;
(2) The ultrafiltration concentrate generated in step (1) is adopted to prepare iron-containing nutrient solution for the biochemical treatment unit. Adding HCl into the ultrafiltration concentrate to adjust the pH to 2-6; adding in ferrous sulfate ($FeSO_4$) or ferrous chloride ($FeCl_2$) to adjust the concentration of $Fe^{2+}$ in the ultrafiltration concentrate to 2-10 mmol/L; then adding in 30% $H_2O_2$ solution to make the concentration of $H_2O_2$ in the ultrafiltration concentrate reach 6-60 mmol/L; mixing the solution for 0.5-6 hours of reaction, and the nutrient solution containing high concentration of $Fe^{3+}$ is therefore obtained;
(3) adding the iron-containing nutrient solution obtained in step (2) into the activated sludge tank of the secondary biochemical treatment unit at the volumetric ratio of 0.1-1.0%; such a treatment can improve the content of activated sludge (MLVSS increasing 5-20%) and its settleability ($SV_{30}$ decreasing 5-25%); the sludge activity is also enhanced, with dehydrogenase (DHA) activity increasing 1-25%, the activity of the electron transfer system (ETS) increasing 30-100% and the specific oxygen uptake rate (SOUR) increasing 1-25%;
(4) channeling the ultrafiltration filtrate obtained in step (1) through the nanofiltration membrane and separating said ultrafiltration filtrate at 10-45° C. and 0.5-5.0 MPa; 50-95% of the original ultrafiltration filtrate will turn to be nanofiltration filtrate while 5-50% of the original ultrafiltration filtrate will turn to be the nanofiltration concentrate. The nanofiltration filtrate contains high concentration of salts while both chromaticity and concentration of organics are considerable low; in contrast, the nanofiltration concentrate is small in proportion and contains high concentration of organics;
(5) adding sodium chloride into the nanofiltration filtrate obtained in step (3) and using it as the resin regeneration agent; the desorption efficiency of the regeneration agent so prepared is 80-99% of that of the fresh regeneration agent;
(6) channeling the nanofiltration concentrate obtained in step (3) back to the ultrafiltration membrane system for cycled treatment.

The pore size (namely, MWCO) of the ultrafiltration membrane used in step (1) is 20000-50000 Da. The ultrafiltration filtrate obtained in step (1) is 60-95% of the original desorption liquid by volume. In step (2), the agent used for providing ferrous ions is either ferrous chloride or ferrous sulfate. The nutrient solution obtained in step (2) is rich in ferric irons, the concentration of which reaches 2-20 mmol/L; the nutrient solution also presents desirable biodegradability, with B/C ratio higher than 0.2.

The MWCO of the nanofiltration membrane used in step (4) is 150-400 Da. The nanofiltration filtrate obtained in step (4) is 60-95% of the original ultrafiltration filtrate by volume. The concentration of $COD_{cr}$ in the nanofiltration filtrate obtained in step (4) is lower than 300 mg/L, and the mass ratio of NaCl contained therein is 3-10%. In step (5), an appropriate amount of NaCl is added into the nanofiltration filtrate to raise its mass ratio to 15-20%.

3. Beneficial Effects

The present invention provides a method for resourceful utilization of desorption liquid generated in the resin ion exchange process. It successfully realizes economical yet effective treatment of desorption liquid that is generated in the resin ion exchange process for water deep treatment. In the present invention, the resin desorption liquid is pre-treated within an ultrafiltration system, which can greatly reduce pollution of the nanofiltration membrane; the working life of nanofiltration membrane is therefore doubled or even longer. The ultrafiltration filtrate is then channeled into the nanofiltration system, meanwhile, the ultrafiltration concentrate, after adding in the ferrous agent and a period of reaction, is prepared into iron-containing nutrient solution for activated sludge. The latter can increase reaction activity and settleability of the sludge by 15% and 10% respectively. The nanofiltration concentrate is channeled back to the ultrafiltration system; meanwhile, the nanofiltration filtrate is reused as resin regeneration agent after adding a certain amount of NaCl. The efficiency of the resin regeneration agent so obtained reaches 95% of the fresh regeneration agent. The method disclosed in the present invention not only reduces the substantial expenses required in the prior art for treatment of resin desorption liquid, but also realizes separate resourceful utilization of salts and organics contained in the desorption liquid. It involves no secondary pollution and enjoys comparatively lower technical cost. The method disclosed in the present invention can be widely adopted for treatment of desorption liquid generated in the resin ion exchange process for water deep purification.

SPECIFIC EMBODIMENTS

This invention is further illustrated by the following embodiments.

Embodiment 1

The desorption liquid used herein was generated from the resin ion exchange process for deep treatment of dyeing wastewater that had undergone secondary treatment, wherein $COD_{cr}$ was 6000 mg/L, the mass ratio of NaCl 7%, turbidity 7.8, and pH 8.9. Channeling said desorption liquid into the ultrafiltration membrane system at 20° C. and 0.7 MPa; the ultrafiltration concentrate and the ultrafiltration filtrate were therefore obtained. The ultrafiltration filtrate was 75% of the original desorption liquid; $COD_{cr}$ contained therein was 5200 mg/L, the mass ratio of NaCl 6.9%, and turbidity 0.85. The ultrafiltration concentrate was 25% of the original desorption liquid; $COD_{cr}$ contained therein was 7200 mg/L, the mass ratio of NaCl 7.2%, and turbidity 12.0.

Channeling said ultrafiltration filtrate into the nanofiltration membrane system at 20° C. and 1.5 MPa; the nanofiltration concentrate and the nanofiltration filtrate were therefore obtained. The nanofiltration concentrate was 25% of said ultrafiltration filtrate; $COD_{cr}$ contained therein was 15000 mg/L and the mass ratio of NaCl was 7.2%. Said nanofiltration concentrate was channeled back to the ultrafiltration system. The nanofiltration filtrate was 75% of said ultrafiltration filtrate; $COD_{cr}$ contained therein was 130 mg/L and the mass ratio of NaCl was 6.8%.

Adding NaCl into said nanofiltration filtrate to raise the mass ratio of NaCl from 6.8% to 15%. The nanofiltration filtrate so prepared was reused as the regeneration agent for desorbing the ion exchange resin; its desorption efficiency was 94% of the fresh regeneration agent.

Adding HCl into said ultrafiltration concentrate ($COD_{cr}$ of which was 7200 mg/L) to adjust the pH to 5; dissolving $FeSO_4 \cdot 7H_2O$ into the solution and stirring it till the concentration of $Fe^{2+}$ reached 8 mmol/L; then adding 30% (by mass) $H_2O_2$ solution into said solution till the concentration of $H_2O_2$ reached 25 mmol/L; stirring 2 hours for reaction. After said oxidation process, the concentration of $COD_{cr}$ in said ultrafiltration concentrate decreased to 4500 mg/L; the biodegradability of said ultrafiltration concentrate was also improved, with B/C ratio rising to 0.25; the concentration of $Fe^{3+}$ reached 8 mmol/L. After these steps, said ultrafiltration concentrate turned to be the nutrient solution for activated sludge.

Taking said nutrient solution for activated sludge as an additive, and adding it into the activated sludge tank of the secondary biochemical treatment unit at the volumetric ratio of 0.1%; after 30 days of continuous operation, the content of activated sludge (MLVSS) increased 6.3% and the settleability of the sludge was improved, with $SV_{30}$ decreasing 7.1%; the sludge activity was also enhanced, with dehydrogenase (DHA) activity increasing 3.8%, the activity of the electron transfer system (ETS) increasing 47% and the specific oxygen uptake rate (SOUR) increasing 4.5%.

Embodiment 2

The operating procedures were the same as those mentioned in embodiment 1, except that when taking said nutrient solution for activated sludge as an additive, it was added into the activated sludge tank of the secondary biochemical treatment unit at the volumetric ratio of 0.3%; after 30 days of continuous operation, the content of activated sludge (MLVSS) increased 9.6% and the settleability of the sludge was improved, with $SV_{30}$ decreasing 10.7%; the sludge activity was also enhanced, with dehydrogenase (DHA) activity increasing 6.3%, the activity of the electron transfer system (ETS) increasing 63% and the specific oxygen uptake rate (SOUR) increasing 7.4%.

Embodiment 3

The operating procedures were the same as those mentioned in embodiment 1, except that when taking said nutrient solution for activated sludge as an additive, it was added into the activated sludge tank of the secondary biochemical treatment unit at the volumetric ratio of 0.5%; after 30 days of continuous operation, the content of activated sludge (MLVSS) increased 13.8% and the settleability of the sludge was improved, with $SV_{30}$ decreasing 12.5%; the sludge activity was also enhanced, with dehydrogenase (DHA) activity increasing 9.3%, the activity of the electron transfer system (ETS) increasing 76% and the specific oxygen uptake rate (SOUR) increasing 8.7%.

Embodiment 4

The operating procedures were the same as those mentioned in embodiment 1, except that when taking said nutrient solution for activated sludge as an additive, it was added into the activated sludge tank of the secondary biochemical treatment unit at the volumetric ratio of 1.0%; after 30 days of continuous operation, the content of activated sludge (MLVSS) increased 17.3% and the settleability of the sludge was improved, with $SV_{30}$ decreasing 15.6%; the sludge activity was also enhanced, with dehydrogenase (DHA) activity increasing 12.4%, the activity of the electron transfer system (ETS) increasing 87% and the specific oxygen uptake rate (SOUR) increasing 10.3%.

Embodiment 5

The desorption liquid used herein was generated from the resin ion exchange process for deep treatment of the municipal sewage that had undergone secondary treatment, wherein $COD_{cr}$ was 4000 mg/L, the mass ratio of NaCl 7%, turbidity 5.8, and pH 8.7. Channeling said desorption liquid into the ultrafiltration membrane system at 20° C. and 0.7 MPa; the ultrafiltration concentrate and the ultrafiltration filtrate were therefore obtained. The ultrafiltration filtrate was 80% of the original desorption liquid; $COD_{cr}$ contained therein was 2250 mg/L, the mass ratio of NaCl 6.9%, and turbidity 0.75. The ultrafiltration concentrate was 20% of the original desorption liquid; $COD_{cr}$ contained therein was 6000 mg/L, the mass ratio of NaCl 7.2%, and turbidity 8.0.

Channeling said ultrafiltration filtrate ($COD_{cr}$: 2250 mg/L; NaCl: 6.9%; turbidity: 0.75) into the nanofiltration membrane system at 20° C. and 1.5 MPa; the nanofiltration concentrate and the nanofiltration filtrate were obtained. The nanofiltration concentrate was 20% of said ultrafiltration filtrate; CODcr contained therein was 7900 mg/L and the mass ratio of NaCl was 7.2%. Said nanofiltration concentrate was channeled back to the ultrafiltration system. The nanofiltration filtrate was 80% of said ultrafiltration filtrate; $COD_{cr}$ contained therein was 125 mg/L and the mass ratio of NaCl was 6.8%.

Adding NaCl into said nanofiltration filtrate to raise the mass ratio of NaCl from 6.8% to 15%. The nanofiltration filtrate so prepared was reused as the regeneration agent for desorbing the ion exchange resin; its desorption efficiency was 95.6% of the fresh regeneration agent.

Adding HCl into said ultrafiltration concentrate ($COD_{cr}$: 6000 mg/L; NaCl: 7.2%; turbidity: 8.0) to adjust the pH to 5; dissolving $FeSO_4 \cdot 7H_2O$ into the solution and stirring it till the concentration of $Fe^{2+}$ reached 8 mmol/L; then adding 30% (by mass) $H_2O_2$ solution into said solution till the concentration of $H_2O_2$ reached 25 mmol/L; stirring 2 hours for reaction. After said oxidation process, the concentration of $COD_{cr}$ in said ultrafiltration concentrate decreased to 3200 mg/L; the biodegradability of said ultrafiltration concentrate was improved, with B/C ratio rising to 0.3; the concentration of $Fe^{3+}$ reached 8 mmol/L. After these steps, said ultrafiltration concentrate turned to be nutrient solution for activated sludge.

Taking said nutrient solution for activated sludge as an additive, and adding it into the activated sludge tank of the secondary biochemical treatment unit at the volumetric ratio of 0.1%; after 30 days of continuous operation, the content of activated sludge (MLVSS) increased 6.7% and the settleability of the sludge was improved, with $SV_{30}$ decreasing 5.8%; the sludge activity was also enhanced, with dehydrogenase (DHA) activity increasing 4.2%, the activity of the electron transfer system (ETS) increasing 45% and the specific oxygen uptake rate (SOUR) increasing 4.4%.

Embodiment 6

The operating procedures were the same as those mentioned in embodiment 5, except that when taking said nutrient solution for activated sludge as an additive, it was added into the activated sludge tank of the secondary biochemical treatment unit at the volumetric ratio of 0.3%; after 30 days of continuous operation, the content of activated sludge (MLVSS) increased 10.3% and the settleability of the sludge was improved, with $SV_{30}$ decreasing 10.1%; the sludge activity was also enhanced, with dehydrogenase (DHA) activity increasing 6.34%, the activity of the electron transfer system (ETS) increasing 60% and the specific oxygen uptake rate (SOUR) increasing 7.0%.

Embodiment 7

The operating procedures were the same as those mentioned in embodiment 5, except that when taking said nutrient solution for activated sludge as an additive, it was added into the activated sludge tank of the secondary biochemical treatment unit at the volumetric ratio of 0.5%; after 30 days of continuous operation, the content of activated sludge (MLVSS) increased 14.0% and the settleability of the sludge was improved, with $SV_{30}$ decreasing 11.5%; the sludge activity was also enhanced, with dehydrogenase (DHA) activity increasing 9.3%, the activity of the electron transfer system (ETS) increasing 65% and the specific oxygen uptake rate (SOUR) increasing 8.6%.

Embodiment 8

The operating procedures were the same as those mentioned in embodiment 5, except that when taking said nutrient solution for activated sludge as an additive, it was added into the activated sludge tank of the secondary biochemical treatment unit at the volumetric ratio of 1.0%; after 30 days of continuous operation, the content of activated sludge (MLVSS) increased 17.8% and the settleability of the sludge was improved, with $SV_{30}$ decreasing 15.1%; the sludge activity was also enhanced, with dehydrogenase (DHA) activity increasing 12.7%, the activity of the electron transfer system (ETS) increasing 76% and the specific oxygen uptake rate (SOUR) increasing 10.5%.

What is claimed is:

1. A method for resourceful utilization of a desorption liquid generated in a resin ion exchange process, comprising the following steps:
    (a) channeling the desorption liquid generated in the resin ion exchange process for water deep purification into an ultrafiltration membrane system at 10-45° C. and 0.2-2.0 MPa, and separating said desorption liquid into a ultrafiltration filtrate and a ultrafiltration concentrate;
    (b) adding an acid, $Fe^{2+}$, and $H_2O_2$ into the ultrafiltration concentrate obtained in step (a) to obtain a solution having a pH of 2-6, a concentration of $Fe^{2+}$ of 2-20 mmol/L, and a concentration of $H_2O_2$ of 6-60 mmol/L; stirring the solution for 2-6 hours to obtain a nutrient solution for activated sludge containing $Fe^{3+}$;
    (c) adding the nutrient solution for activated sludge obtained in step (b) into the activated sludge tank of a biochemical treatment unit at a volumetric ratio of 0.1-1.0%;
    (d) channeling the ultrafiltration filtrate obtained in step (a) through a nanofiltration membrane system at 10-45° C. and 0.5-5.0 MPa, and separating said ultrafiltration filtrate into the nanofiltration filtrate and the nanofiltration concentrate;
    (e) channeling the nanofiltration concentrate obtained in step (d) back to the ultrafiltration system; and
    (f) adding an effective amount of NaCl into the nanofiltration filtrate obtained in step (d) and reusing a resulting nanofiltration filtrate as the resin regeneration agent.

2. The method of claim 1, wherein a molecular weight cutoff (MWCO) of the ultrafiltration membrane in step (a) is 10000-50000 Da.

3. The method of claim 2, wherein said ultrafiltration filtrate is 60-95% by volume of the original desorption liquid in step (a).

4. The method of claim 1, wherein a source of $Fe^{2+}$ in step (b) is ferrous chloride ($FeCl_2$) or ferrous sulfate ($FeSO_4$).

5. The method of claim 1, wherein the nutrient solution obtained in step (b) has $Fe^{3+}$ of 2-20 mmol/L.

6. The method of claim 1, wherein, after step (c), the activated sludge in the sludge tank has an increase in MLVSS, a decrease in $SV_{30}$, an increase in a dehydrogenase (DHA) activity, and an increase in an electron transfer system (ETS), and an increase in a specific oxygen uptake rate (SOUR).

7. The method of claim 1, wherein the MWCO of the nanofiltration membrane in step (d) is 150-400 Da.

8. The method of claim 1, wherein said nanofiltration filtrate is 60-95% of the ultrafiltration filtrate by volume.

9. The method of claim 1, wherein a $COD_{cr}$ concentration in the nanofiltration filtrate obtained in step (d) is lower than 300 mg/L and a mass ratio of NaCl therein is 3-10%.

10. The method of claim 1, wherein a mass ratio of NaCl in the resulting nanofiltration filtrate is 15-20%.

11. The method of claim 1, wherein the acid is HCl.

* * * * *